United States Patent
Takenaka

(10) Patent No.: US 10,534,986 B2
(45) Date of Patent: Jan. 14, 2020

(54) PRINTING APPARATUS HAVING INTERPRETERS INTERPRETING PRINT DATA, PRINTING METHOD, AND STORAGE MEDIUM

(71) Applicant: CANON KABUSHIKI KAISHA, Tokyo (JP)

(72) Inventor: Shuichi Takenaka, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/430,186

(22) Filed: Feb. 10, 2017

(65) Prior Publication Data
US 2017/0243089 A1    Aug. 24, 2017

(30) Foreign Application Priority Data
Feb. 19, 2016 (JP) .................. 2016-029523

(51) Int. Cl.
*G06K 15/00* (2006.01)
*G06K 15/02* (2006.01)

(52) U.S. Cl.
CPC ..... *G06K 15/1813* (2013.01); *G06K 15/1805* (2013.01); *G06K 15/1807* (2013.01); *G06K 15/1809* (2013.01); *G06K 15/1823* (2013.01); *G06K 15/1857* (2013.01); *G06K 15/1868* (2013.01); *G06K 15/1872* (2013.01); *G06K 15/403* (2013.01)

(58) Field of Classification Search
CPC ............ G06K 15/1813; G06K 15/403; G06K 15/1872; G06K 15/1868; G06K 15/1857; G06K 15/1809; G06K 15/1807; G06K 15/1805; G06K 15/1823; G06K 15/1806; G06K 15/1822; G06K 15/1849; G06F 3/1248
USPC ....................................... 358/1.13
See application file for complete search history.

(56) References Cited

U.S. PATENT DOCUMENTS

| | | | | |
|---|---|---|---|---|
| 6,075,617 | A * | 6/2000 | Fischer | G06K 15/02 358/1.13 |
| 9,733,606 | B2 * | 8/2017 | Ikuno | G06K 15/1807 |
| 2004/0257390 | A1 * | 12/2004 | Ito | G06F 3/1241 347/5 |
| 2009/0057974 | A1 * | 3/2009 | Fairweather | B65H 29/12 270/1.01 |

(Continued)

FOREIGN PATENT DOCUMENTS

| | | |
|---|---|---|
| JP | 2010-149422 A | 7/2010 |
| JP | 2013-014039 A | 1/2013 |

*Primary Examiner* — Benny Q Tieu
*Assistant Examiner* — Juan M Guillermety
(74) *Attorney, Agent, or Firm* — Canon U.S.A., Inc. IP Divison

(57) ABSTRACT

A printing apparatus includes a first interpretation unit configured to generate intermediate data of a page by interpreting print data, a second interpretation unit configured to generate intermediate data of another page by interpreting the print data, and a controller configured to perform, according to a specific print setting command indicating that a specific process is to be performed on all pages, control such that the specific process is performed on all the pages. The controller performs the control if the specific print setting command is included in a specific page.

14 Claims, 14 Drawing Sheets

(56) References Cited

U.S. PATENT DOCUMENTS

| | | | |
|---|---|---|---|
| 2009/0150873 A1* | 6/2009 | Taneda | G06K 15/1805 |
| | | | 717/148 |
| 2009/0279126 A1* | 11/2009 | Williams | G06K 15/1809 |
| | | | 358/1.15 |
| 2010/0290070 A1* | 11/2010 | Takeishi | G06F 3/1245 |
| | | | 358/1.13 |
| 2012/0250094 A1* | 10/2012 | Matsuda | G06K 15/1857 |
| | | | 358/1.17 |
| 2012/0307276 A1* | 12/2012 | Takenaka | G06K 15/1861 |
| | | | 358/1.13 |
| 2012/0314240 A1* | 12/2012 | Randell | G06K 15/1856 |
| | | | 358/1.14 |
| 2014/0092410 A1* | 4/2014 | Taima | G06F 3/1244 |
| | | | 358/1.13 |
| 2014/0104645 A1* | 4/2014 | Hayakawa | G06K 15/1848 |
| | | | 358/1.15 |
| 2015/0227821 A1* | 8/2015 | Komazawa | G06K 15/1823 |
| | | | 358/1.2 |
| 2016/0259998 A1* | 9/2016 | Miyagawa | G06K 15/1868 |
| 2016/0283829 A1* | 9/2016 | Ishiguro | G06K 15/186 |

* cited by examiner

FIG. 3

```
IPS-Adobe-3.0

<</Staple 3 /StapleDetails <</Type 21 /Position (2PL) >> >> setpagedevice    } Page1
<</PageSize [595 842] /Policies <</PageSize 2>> >> setpagedevice <</DeviceRenderingInfo <</Type 35 /ImageSharpness (HIGH) >> >> setpagedevice
/Times-Roman findfont 50 scalefont setfont
130 421 moveto (Page : 1) show
showpage <</DeviceRenderingInfo <</Type 35 /ImageSharpness (LOW) >> >> setpagedevice    } Page2
130 421 moveto (Page : 2) show
showpage <</DeviceRenderingInfo <</Type 35 /ImageSharpness (HIGH) >> >> setpagedevice   } Page3
130 421 moveto (Page : 3) show
showpage <</DeviceRenderingInfo <</Type 35 /ImageSharpness (HIGH) >> >> setpagedevice   } Page4
130 421 moveto (Page : 4) show
showpage
```

PRINTING APPARATUS HAVING INTERPRETERS INTERPRETING PRINT DATA, PRINTING METHOD, AND STORAGE MEDIUM

BACKGROUND OF THE INVENTION

Field of the Invention

The aspect of the embodiments relates to a technique of performing interpretation on print data using a plurality of interpreters.

Description of the Related Art

In general, printing apparatuses having a plurality of interpreters (interpretation units) which process page description language (PDL) data in parallel in a unit of page have been used. In a printing apparatus disclosed in Japanese Patent Laid-Open No. 2013-14039, a plurality of interpreters interpret PDL data in different pages in parallel so as to generate intermediate data of the pages. For example, a first interpreter performs interpretation on a PDL command included in a first page so as to generate intermediate data, and a second interpreter performs the same process on a second page. Thereafter, a rasterizer rasterizes the intermediate data so as to generate raster images, and before rasterization on all the pages is terminated, printing on the pages in which raster images are generated is timely started so that the printing is completed early.

According to the printing apparatus disclosed in Japanese Patent Laid-Open No. 2010-149422, as interpretation of different pages performed by a plurality of interpreters so as to generate intermediate data, the interpreters interpret print setting commands included in the individual pages and generate intermediate data of the individual pages in accordance with the interpreted print settings.

Examples of PDL commands include a print setting command (also referred to as a "PDL designation of a job attribute") indicating that a predetermined process is to be performed on all pages (an entire print job). A command indicating that a staple binding process is to be performed on all the pages, that is, a staple binding designation command, is an example of the PDL designation of a job attribute. A case where such PDL data including a PDL command is processed using a plurality of interpreters in parallel similarly to a case of a general printing apparatus is considered.

In a case where a staple binding designation command is included in a first page, a first interpreter interprets the first page and enables a setting of a staple binding process. In this case, even if completion of the process performed on the first page by the first interpreter is later than completion of a process performed on a second page by a second interpreter, the printing apparatus performs control such that the second page is printed after the first page, and therefore, the binding process may be performed also on the second page processed by the second interpreter. Specifically, if a staple binding designation command is included in the first page, the staple binding process may be performed on the second page (onwards).

On the other hand, the following situation occurs when a staple binding designation command is included only in the second page. Before the second interpreter interprets the staple binding designation command, the first interpreter has completed the process performed on the first page, and therefore, the first page is printed. Even if the second interpreter interprets the binding designation command included in the second page and enables a setting of the binding process, the staple binding process may not be performed on all the pages since the first page has been printed.

Specifically, in the printing apparatus which interprets print data in parallel using a plurality of interpretation units, if a page including a print setting command for an entire job is not taken into consideration, the process may be performed on an entire job or may not be performed on the entire job, that is, reproducibility of operation is not realized.

SUMMARY OF THE INVENTION

According to an aspect of the embodiments a printing apparatus includes a first interpretation unit configured to generate intermediate data of a page by interpreting print data, a second interpretation unit configured to generate intermediate data of another page by interpreting the print data, and a controller configured to perform, according to a specific print setting command indicating that a specific process is to be performed on all pages, control such that the specific process is performed on all the pages. The controller performs the control if the specific print setting command is included in a specific page.

Further features of the disclosure will become apparent from the following description of exemplary embodiments with reference to the attached drawings.

BRIEF DESCRIPTION OF THE DRAWINGS

FIG. 3 is a diagram illustrating a description of print data.

DESCRIPTION OF THE EMBODIMENTS

Hereinafter, an embodiment of the disclosure will be described with reference to the accompanying drawings. Note that PostScript (PS) (registered trademark) is used as an example of a type of PDL data in this embodiment. The PDL data is also referred to as "print data" or a "print job".

Examples of a print attribute to be designated in a description of PS include a page print attribute (a page attribute) designated for each page and a job print attribute (a job attribute) designated for each job.

A print setting command (a PDL command) of the page printing attribute is also referred to as "PDL designation" of a page attribute, and is used not to perform a specific process on all pages but used to perform the specific process only on a predetermined page. For example, designation of double-sided printing, designation of an image shift, designation of a sheet color, and the like are included in the PDL designation of a page attribute which may be specified in a unit of page.

A print setting command (a PDL command) of the job printing attribute is also referred to as "PDL designation of a job attribute", and is issued to perform a specific process on an entire printing job (all pages). For example, designation of finishing including punching and a staple binding process, designation of layout including bookbinding printing and collective printing, designation of rendering quality including image sharpness, output resolution, and a color mode are included in the PDL designation of a job attribute.

Note that, in PS, the PDL designation of a page attribute or a job attribute may be described in an arbitrary portion of an arbitrary page of the PDL data. Furthermore, interpretation of the PDL designation and a process performed in accordance with the interpretation may be freely controlled by a printing apparatus.

First Embodiment

Block Diagram of Hardware of Image Forming Apparatus

Figure 1:
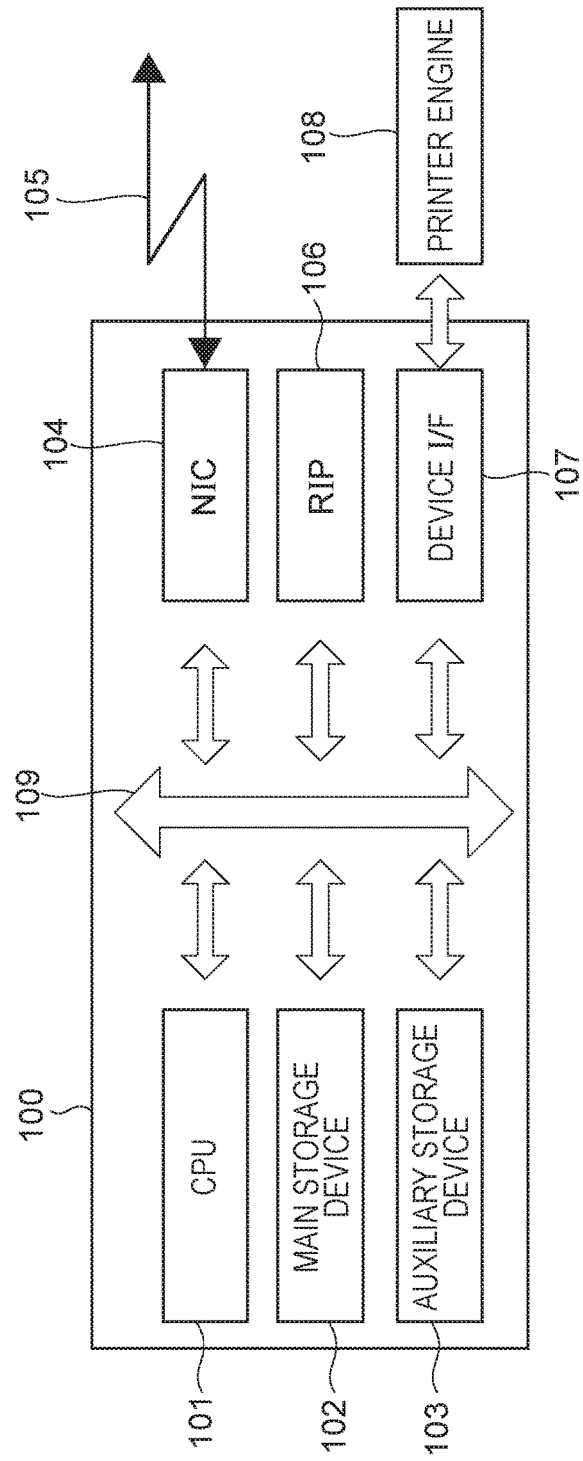
FIG. 1 is a diagram illustrating a hardware configuration of an image forming apparatus.

FIG. 1 is a hardware block diagram illustrating a configuration of an image forming apparatus (a printing apparatus) according to a first embodiment. In FIG. 1, a controller unit 100 controls input and output of image signals and device information.

A central processing unit 101 reads a program stored in an auxiliary storage device 103 into a main storage device 102 and executes the program. Furthermore, the central processing unit 101 integrally controls devices connected to a system bus 109. As the central processing unit 101, a multicore CPU having a plurality of processors as hardware is employed to realize parallel processing. Furthermore, the central processing unit 101 may include a plurality of processor cores as microprocessors. The central processing unit 101 may use a technique of using one processor functioning as a plurality of processors by effectively using an unoccupied time of a register or a pipe line included in the processor, such as a technique of hyper-threading.

The main storage device 102 is a RAM and functions as a main memory and a work memory of the central processing unit 101.

The auxiliary storage device 103 is an HDD and used to temporarily or permanently store mass data. In this embodiment of the disclosure, intermediate data (DisplayList (DL)) is stored in a buffer region when parallel processing in a unit of page (hereinafter referred to as "page parallel") is performed, and a destination of the storage is the main storage device 102 or the auxiliary storage device 103.

A network interface card (NIC) 104 is connected to a network 105, and performs reception of print data and device information supplied from an external apparatus externally provided relative to the image forming apparatus and transmission of print data and device information to the external apparatus.

An RIP (raster image processor) 106 converts a DL which is the intermediate data into a raster image. This conversion process is referred to as "rasterizing" or "rendering", and the RIP is also referred to as a rasterizer. The RIP 106 processes a DL, generated in the main storage device 102 and the auxiliary storage device 103 by the central processing unit 101, at high speed in parallel to execution of the central processing unit 101.

A device I/F 107 performs transmission of an image signal based on a raster image, an instruction for operating a device, and reception of device information in accordance with an instruction issued by the central processing unit 101. The controller unit 100 is connected to a printer engine 108 through the device I/F 107.

The printer engine 108 is an output machine which outputs (prints) an image based on an image signal supplied form the controller unit 100 on a printing medium (a sheet), and may employ an electrophotographic method or an inkjet method.

A finisher, not illustrated, is connected to the controller unit 100 and receives a control signal supplied from the controller unit 100. The finisher performs a finishing process (the staple binding process or the punching process) on a printed matter supplied from the printer engine 108 in accordance with the control signal. Note that the control signal is output from the controller unit 100 in accordance with a result of a determination as to whether PDL designation of a job attribute described above has been enabled. For example, the controller unit 100 transmits a control signal for instructing execution of the staple binding process to the finisher when an interpreter described below interprets PDL designation of the staple binding process on all pages from a first page (or a specific page) of valid pages. Note that, if the PDL designation of the staple binding process included in a second page of the valid pages is interpreted by an interpreter, the controller unit 100 does not transmit a control signal for instructing execution of the staple binding process to the finisher.

Diagram of Software Module of Image Forming Apparatus

Figure 2:
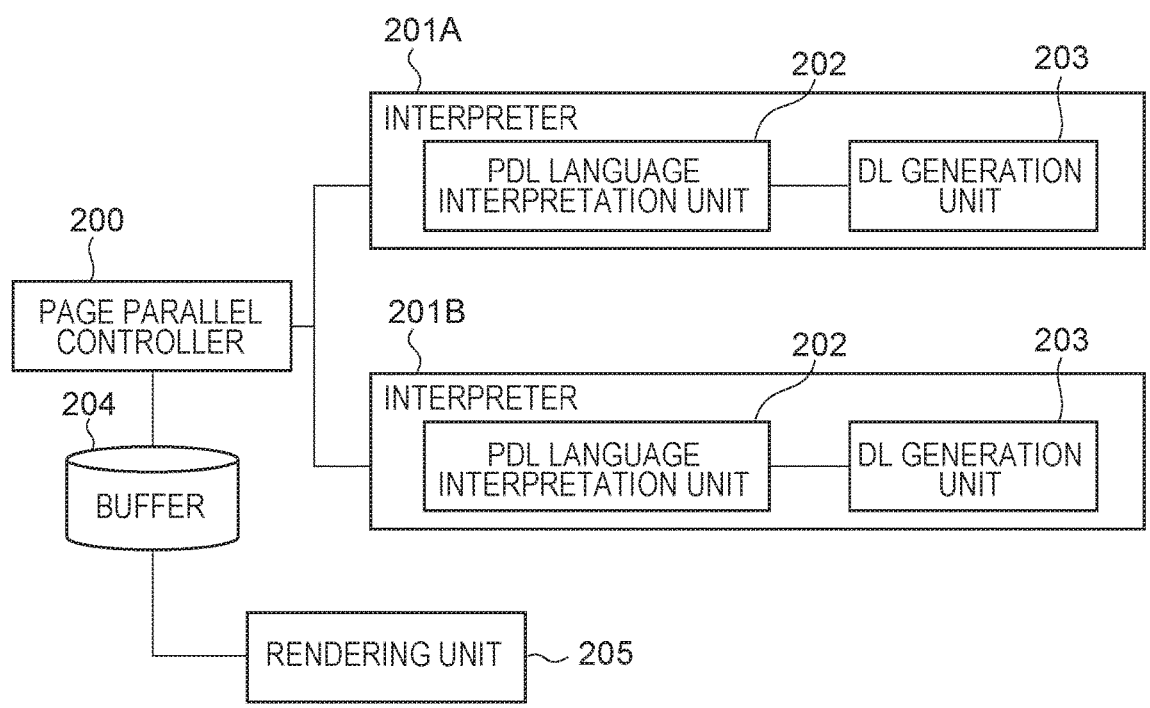
FIG. 2 is a diagram illustrating a software configuration of the image forming apparatus.

FIG. 2 is a diagram illustrating a configuration of software modules of the image forming apparatus according to this embodiment. The software modules illustrated in FIG. 2 are stored in the auxiliary storage device 103 as programs, loaded into the main storage device 102, and executed by the central processing unit 101. Note that the central processing unit 101 which executes the software modules described below processes data while temporarily storing the data in the main storage device 102 and the auxiliary storage device 103.

A page parallel controller 200 activates a plurality of threads of PS interpreters (hereinafter referred to as "interpreters") 201, and controls the threads. The page parallel controller 200 divides print data in a unit of page so that a plurality of pages are processed in parallel and assigns the pages to be processed to the threads. It is assumed that two threads are generated in this embodiment, and therefore, two interpreters 201 are provided. However, a number of threads which meet capability of parallel control of the processor core of the central processing unit 101 may be generated and the interpreters 201 may be assigned to the individual threads.

Each of the interpreters 201 including a PDL language interpretation unit 202 and a DL generation unit 203 interprets print data so as to generate a DL as intermediate data. The PDL language interpretation unit 202 is a data interpretation unit which interprets content of print data described in a page description language. The DL generation unit 203 generates intermediate data (a DL) from content interpreted by the PDL language interpretation unit 202.

A buffer 204 buffers DLs generated by a plurality of interpreters 201. When the page parallel technique is employed, processes of the threads may not be completed in page order but a succeeding page in the page order (a second page, for example) may be processed before a preceding page (a first page, for example) is processed. However, the print data is to be output (printed) in the page order, and therefore, the buffer 204 is used as a buffering region used until unprocessed pages are processed. Although a portion of the main storage device 102 is secured and used as the buffering region, if the main storage device 102 does not have a region which is sufficiently large for buffering, a portion of the auxiliary storage device 103 may be used instead.

A rendering unit 205 transmits the DLs stored in the buffer 204 to the RIP 106 of FIG. 1. The RIP 106 rasterizes the received DLs.

Description of Print Data

FIG. 3 is a diagram illustrating description of a rendering object and a print attribute in the print data. The description in FIG. 3 is an example of a description of print data using a PS command (operator). In a portion of Page 1, PDL designation including stapling designation, sheet size designation, and image sharpness (HIGH) designation is performed as print attributes and a character string "Page: 1" is defined. In Page 2, PDL designation including image sharpness (LOW) designation is performed as a print attribute and a character string "Page: 2" is defined. In Page 3, PDL designation including image sharpness (HIGH) designation is performed as a print attribute and a character string "Page: 3" is defined. In Page 4, PDL designation including image sharpness (HIGH) designation is performed as a print attribute and a character string "Page: 4" is defined. An operator "showpage" is used at breakpoints between pages.

PDL Designation Control of Job Attribute

The print attributes associated with the stapling, the sheet size, and the image sharpness described in the description example of FIG. 3 are PDL designation of a job attribute in the image forming apparatus. The PDL designation of a job attribute may be described in any portion in the PDL data any number of times, and the image sharpness designation is performed on each page. A selection of a job attribute or a page attribute of the PDL designation of the print attribute depends on a configuration of the image forming apparatus. In a case of an image forming apparatus having a hardware mechanism which changes rendering quality designation (image sharpness designation in this embodiment) in a unit of page, the rendering quality designation may be employed as a page attribute. However, in a case of an image forming apparatus which does not have such an image hardware configuration, the rendering quality designation is to be used as a job attribute, and as a PDL designation, a description in a first page is determined valid.

Figure 4:
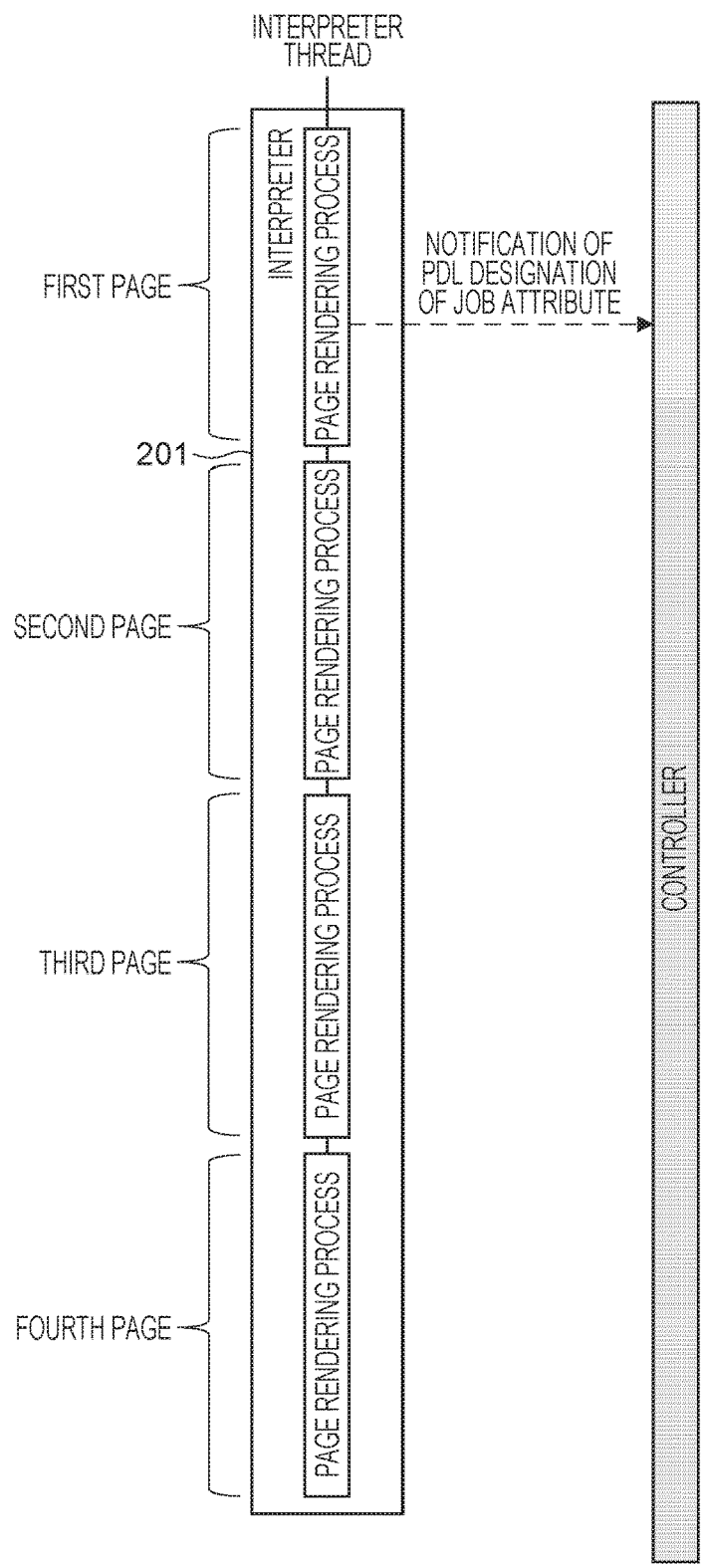
FIG. 4 is a diagram illustrating a sequence of PDL designation of a job attribute in a single thread.

FIG. 4 is a diagram illustrating a sequence of PDL designation control of a job attribute in a single thread in an image forming apparatus which does not have the mechanism which changes the rendering quality designation in a unit of page. When an image forming process is started, the interpreter 201 executes a language interpretation process from the top of data. PDL designation of a job attribute detected in the language interpretation process performed on a first page is PDL designation in a unit of job detected in a "beginning page", and therefore, all PDL designation is transmitted to a controller. After the language interpretation process performed on the first page is terminated, a second page and the following pages are subjected to the language interpretation process. However, even when PDL designation of a job attribute is detected, the detected PDL designation is not PDL designation for each job detected in the "beginning page", and therefore, it is determined that the PDL designation is invalid and is not transmitted to the controller.

By this, the print attribute of the job attribute of the PDL designation on the first page is employed in all pages.

Page Parallel Process

In this embodiment, a page parallel process performed when a PDL (PostScript, for example) which may be described in a page dependent manner (page dependence) as a page description language of print data is employed is described. For example, PostScript may describe setting information in a certain page and the setting information also affects another page after the certain page. Therefore, in a case where a page parallel technique is employed in a print process employing PostScript, the PDL language interpretation units 202 of threads to be subjected to a multithread process are to perform language interpretation on the print data in order of page from a top page of the data.

Figure 5:
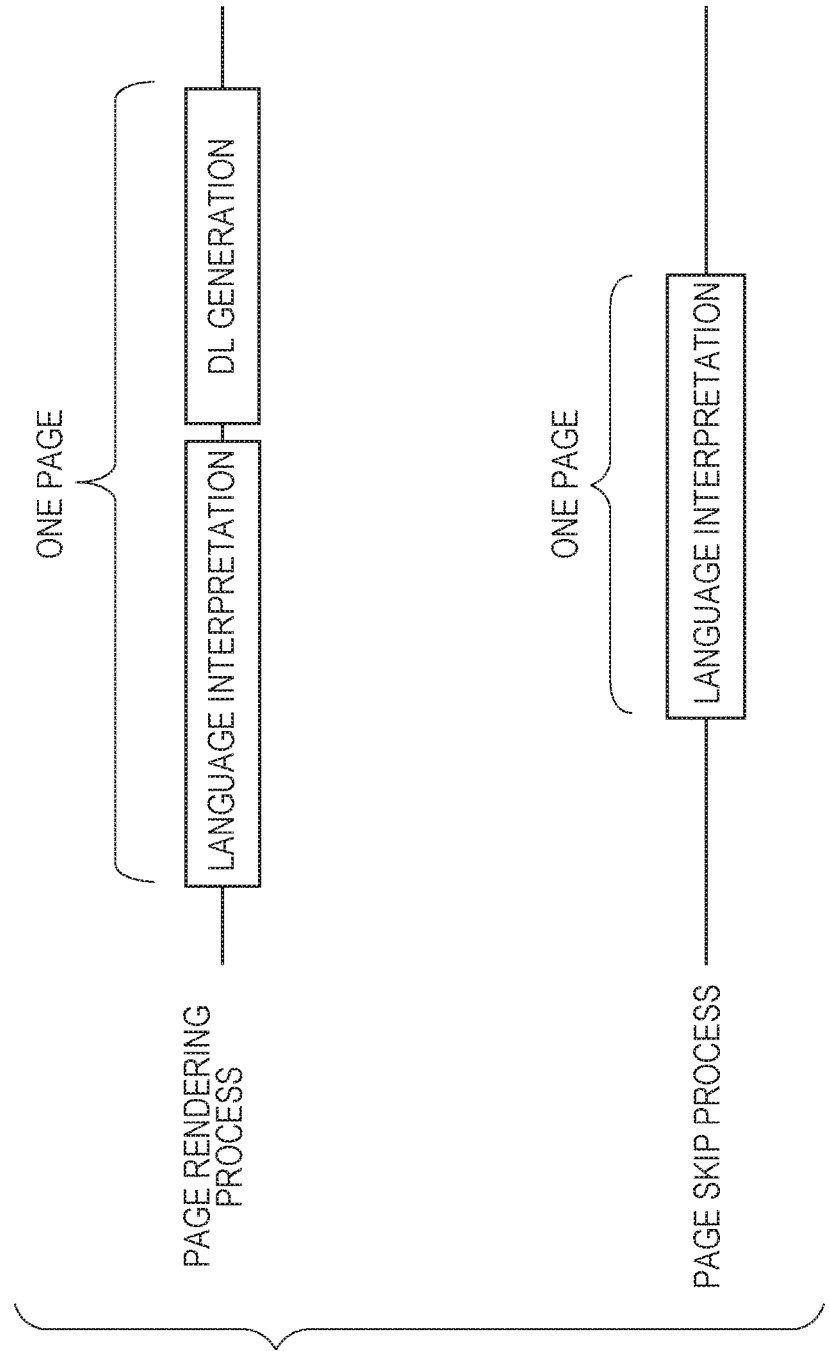
FIG. 5 is a diagram illustrating operation modes of an interpreter.

Therefore, in this embodiment, each of the interpreters 201 performs a process in two operation modes as illustrated in FIG. 5. In a page skip process which is a first operation mode, the interpreter 201 performs a language interpretation process using the PDL language interpretation unit 202 but does not perform DL generation using the DL generation unit 203. In a page rendering process which is a second operation mode, the interpreter 201 performs both of the language interpretation process using the PDL language interpretation unit 202 and the DL generation using the DL generation unit 203. In the page skip process, a DL generation process is not performed, and therefore, the process may be quickly performed. Furthermore, since the language interpretation process is performed in the page skip process, even if the page skip process is performed until a page immediately before a page of a target of DL generation (which is referred to as a "generation page"), setting information may be obtained until the page immediately before the page of the target of the DL generation. Then the generation page is subjected to the page rendering process so that DL generation in which the setting information obtained until the page immediately before the page of the target of the DL generation and the setting information obtained in the generation page are reflected may be executed. In other words, in both of the page skip process and the page rendering process, the language interpretation process is performed on the individual pages from the top page of the print data, and therefore, lack of information required for the generation page does not occur and a printing process may be normally performed.

Figure 6:
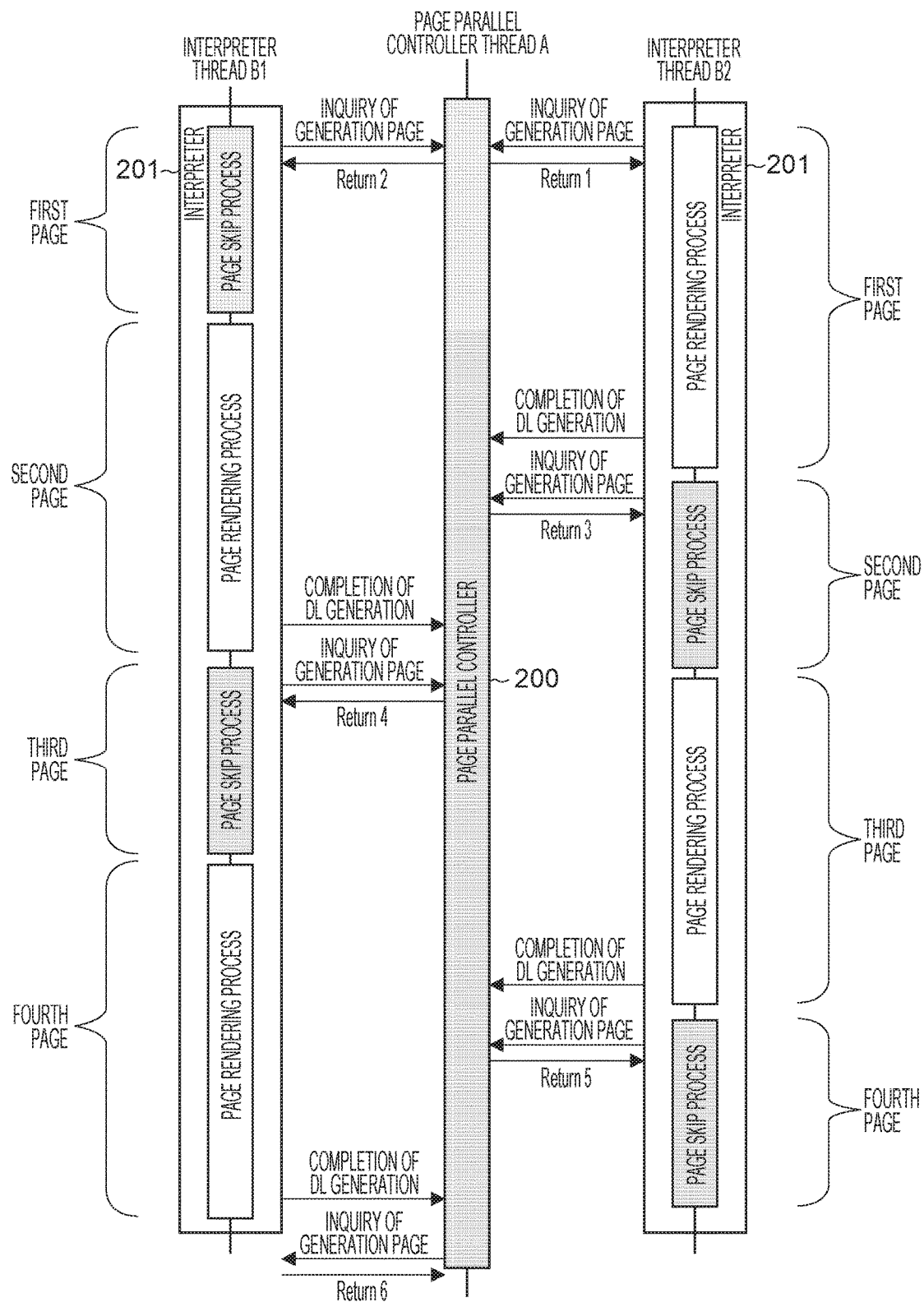
FIG. 6 is a diagram illustrating a basic sequence of page parallel control.

FIG. 6 is a diagram illustrating a basic sequence of the page parallel control of this embodiment. The page parallel controller 200 serving as a thread A generates threads B1 and B2 and the interpreters 201 are assigned to the individual threads. When the process is started, the interpreters 201 transmit inquiries of page numbers of generation pages to the page parallel controller 200.

The page parallel controller 200 transmits the page numbers of the generation pages to be assigned to the individual threads taking a parallelism of the threads into consideration. In the example of FIG. 6, an instruction for processing a second page is transmitted to the thread B1 and an instruction for processing a first page is transmitted to the thread B2. When the generation pages are transmitted from the page parallel controller 200, the interpreters 201 perform the page skip process on pages before the generation pages and the page rendering process on the generation pages.

Since the first page is the generation page in the thread B2, the page rendering process is performed from the beginning. Since the second page is the generation page in the thread B1, the page skip process is performed on the first page and the page rendering process is performed on the second page. In the thread B2, when the page rendering process on the first page is terminated, a notification indicating completion of DL generation is transmitted to the page parallel controller 200, and thereafter, an inquiry of a page number of a next generation page is transmitted. In the example of FIG. 6, the page parallel controller 200 has not instructed a process on a third page at this timing, and therefore, a notification indicating that a third page is the next generation page is transmitted to the thread B2. Similarly, the interpreters 201 repeatedly perform the inquiries of generation pages to the page parallel controller 200, the language interpretation process, and the DL generation in the generation page in the threads B1 and B2.

In this way, the process is continuously performed until the last page while the page skip process and the page rendering process are switched from one to another so that the page parallel process is realized.

Figure 7:
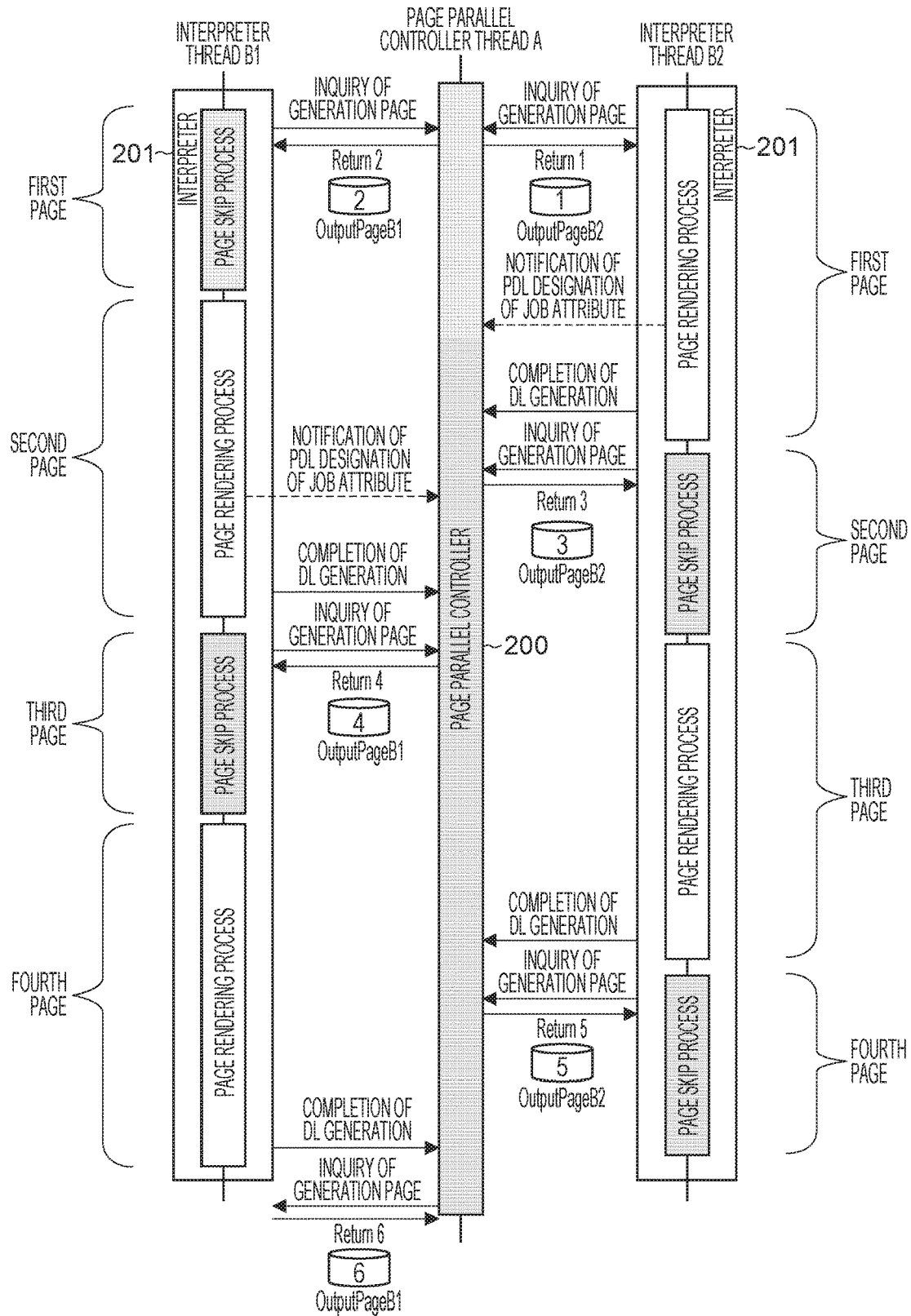
FIG. 7 is a diagram illustrating a sequence of page parallel control according to a first embodiment.

FIG. 7 is a diagram illustrating a sequence of control of the page parallel process in multithread and the PDL designation of a job attribute according to the first embodiment. The page parallel controller 200 has page counter values (OutputPage) for individual threads which manage and control page numbers to be assigned to the individual threads. In the example of FIG. 7, first, an instruction for processing a second page is issued to the thread B1 and an instruction for processing a first page is issued to the thread B2. In this case, "2" is stored in a page counter value OutputPageB1 of the thread B1 and "1" is stored in a page counter value OutputPageB2 of the thread B2. When the notifications of the generation pages are supplied from the page parallel controller 200, the interpreters 201 perform the page skip process on pages before the generation pages and perform page rendering process on the generation pages.

In each of the threads, when the page rendering process on the specified page is terminated, a notification indicating completion of DL generation is transmitted to the page parallel controller 200, and thereafter, an inquiry of a page number of a next generation page is transmitted. The page parallel controller 200 transmits notifications indicating appropriate page numbers to be processed next in response to the inquiries and stores the specified page numbers in the page counter values of the threads.

Here, "1" is specified as the page number of the generation page of the thread B2, and therefore, the page rendering process is performed on the first page. It is assumed that the PDL designation of a job attribute is detected in the page rendering process in the thread B2. This page rendering process performed on the first page is a "first page rendering process" for the interpreter 201 of the thread B2, and therefore, the thread B2 transmits a notification indicating content of the detected PDL designation to the page parallel controller 200. Here, the page parallel controller 200 refers to page counter values of the individual threads and determines a page indicated by a page number and a thread which performs the page rendering process on the page which corresponds to the notification of the PDL designation of a job attribute. If the thread corresponding to the notification performs the page rendering process on the page of the page number "1", the page parallel controller 200 determines that the transmitted PDL designation of the job attribute is valid. Specifically, a print attribute of a job is determined in accordance with the transmitted PDL designation of the job attribute. For example, the stapling process is performed on all pages.

On the other hand, "2" is specified as the page number of the generation page of the thread B1, and therefore, the page rendering process is performed on the second page after the page skip process is performed on the first page. It is assumed that the PDL designation of a job attribute is detected in the page rendering process performed on the second page in the thread B1. This page rendering process performed on the second page is a "first page rendering process" for the interpreter 201 of the thread B1, and therefore, the thread B1 transmits a notification indicating content of the detected PDL designation to the page parallel controller 200. Also in this case, the page parallel controller 200 refers to page counter values of the individual threads and determines a page indicated by a page number and a thread which performs the page rendering process on the page which corresponds to the notification of the PDL designation of a job attribute. Since the thread corresponding to the notification performs the page rendering process on the page of the page number "2", the page parallel controller 200 determines that the notification of the PDL designation of a job attribute is invalid. Specifically, even if the PDL designation of a job attribute of the image sharpness is performed on the second page, the PDL designation is not reflected to the entire job, and accordingly, image quality of the first and second pages is prevented from being changed.

As described above, even in the parallel process in a unit of page, the print attribute of the PDL designation may be appropriately coped with by performing switching between a valid state and an invalid state of the PDL designation of a job attribute transmitted from the individual threads with reference to the page counter values stored in the page parallel controller 200. In this embodiment, even in a case where the page parallel process is performed in multithread, only PDL designation of a job attribute described in a first page of a plurality of pages may be appropriately enabled.

Control Flow of Page Parallel Controller

Next, page control in the page parallel process performed by the page parallel controller 200 will be described with reference to FIG. 8. The page parallel controller 200 has internal page counter values OutputPage and TotalPage for page control. The number of page counter values OutputPage corresponds to the number of generated threads of interpreters, and the page counter values OutputPage are used to manage numbers of pages being processed by the individual threads. The page counter value TotalPage is used to manage a page number currently instructed to the interpreters, and notifications of page numbers of generation pages are transmitted to the individual threads with reference to the value TotalPage. When the NIC 104 receives print data, the central processing unit 101 executes a program stored in the auxiliary storage device 103 and activates an execution thread A of the page parallel controller 200 so that this process is started. Note that the print data received by the NIC 104 is stored in the auxiliary storage device 103.

First, in step S1000, the page parallel controller 200 obtains (reads) print data from the auxiliary storage device 103.

In step S1001, the page parallel controller 200 generates threads B1 and B2 to be described below with reference to FIG. 9 and assigns interpreters 201 to the threads B1 and B2. Specifically, the page parallel controller 200 activates the execution threads B1 and B2 of the interpreters 201.

In step S1002, the page parallel controller 200 sets 0 to the value TotalPage as an initial process.

In step S1003, the page parallel controller 200 generates a number of values OutputPage corresponding to the number of interpreter threads generated in step S1001 and set 0 to the values OutputPage as an initial process.

In step S1004, the page parallel controller 200 waits for communication from the interpreters 201 activated in step S1001. Here, the page parallel controller 200 waits for communication from the interpreters 201, such as an inquiry of a generation page, PDL designation of a job attribute, or a notification of completion of DL generation. When the page parallel controller 200 receives the communication from one of the threads of the interpreters 201, the process proceeds to step S1005.

In step S1005, the page parallel controller 200 determines whether the communication received from one of the interpreters 201 in step S1004 is an inquiry of a generation page. When the determination is affirmative, the process proceeds to step S1006. When the determination is negative, the process proceeds to step S1009.

In step S1006, the page parallel controller 200 adds 1 to the value TotalPage so that the page number of the generation page to be transmitted to the interpreter 201 is set one page ahead.

In step S1007, the page parallel controller 200 determines a thread corresponding to the interpreter of an inquiry source and assigns the value TotalPage to the counter value OutputPage of the thread.

In step S1008, the page parallel controller 200 notifies the thread of the interpreter 201 of the inquiry source of the value TotalPage (the corresponding value OutputPage). For example, if the inquiry is supplied from the thread B1, the page parallel controller 200 notifies the thread B1 of the value OutputPage of the thread B1. Thereafter, the process returns to step S1004 where the page parallel controller 200 waits for a notification from one of the interpreters 201.

In step S1009, the page parallel controller 200 determines whether the communication received from one of the interpreters 201 in step S1004 is PDL designation of a job attribute, and determines whether the value OutputPage corresponding to the thread is 1. Specifically, the page parallel controller 200 determines whether a notification indicating the PDL designation of a job attribute included in a first page of the print data has been transmitted. The notification indicating the PDL designation of a job attribute having the value OutputPage of 1 has been transmitted, the process proceeds to step S1010, and otherwise, the process proceeds to step S1011.

In step S1010, the page parallel controller 200 enables the PDL designation of a job attribute transmitted as the notification in step S1009. Specifically, the page parallel controller 200 enables the transmitted PDL designation of a job attribute as a print attribute to be employed in an entire job if the transmitted PDL designation of a job attribute is included in the first page of the print data.

In step S1011, the page parallel controller 200 determines whether the communication received from the interpreter 201 in step S1004 is a notification of completion of DL generation. When the determination is affirmative, the process proceeds to step S1012. On the other hand, when the determination is negative, since the interpreter 201 has transmitted another notification, the process returns to step S1004 and the process from step S1004 onwards is performed again.

In step S1012, the page parallel controller 200 spools DL generated by the interpreter 201 in a buffer region managed by the buffer 204.

In step S1013, the page parallel controller 200 determines whether all DL generation processes performed until a page number included in the notification of the completion of the DL generation received from the interpreters 201 in step S1004 has been completed. For example, in a case where DL of N-th page is generated by the interpreter 201, the page parallel controller 200 determines whether generation of DLs before the DL of the N-th page (that is, a DL of an (N−1)-th page and so on) has been completed. When all DLs have been generated, the process proceeds to step S1014. On the other hand, when at least one of the DLs has not been generated, the process returns to step S1004 and the process from step S1004 onwards is performed again.

In step S1014, the page parallel controller 200 transfers all DLs spooled in the buffer region in the buffer 204 to the rendering unit 205 in page order. The buffer 204 deletes the transferred DLs from the buffer region so as to generate an unused area.

In step S1015, the page parallel controller 200 determines whether DLs of all pages included in the print data have been transferred. This determination may be performed by determining whether the threads B1 and B2 generated in step S1001 are stopped. When the determination is affirmative, the process proceeds to step S1016. On the other hand, when the determination is negative, the process returns to step S1004 and the process from step S1004 onwards is performed again.

In step S1016, the page parallel controller 200 stops the thread A of itself so as to terminate the process.

By the process described above, the page parallel controller 200 performs the page control of the page parallel process. In particular, the process in step S1009 and step S1010 appropriately enables only the PDL designation of a job attribute on the first page included in the print data even in a case where the parallel process is performed in a unit of page using a plurality of interpreters in multithread.

Flow of Parallel DL Generation Control of Interpreters

Next, a flow of a parallel DL generation control in the threads B1 and B2 of the interpreters 201 will be described with reference to a flowchart of FIG. 9.

Figure 8:
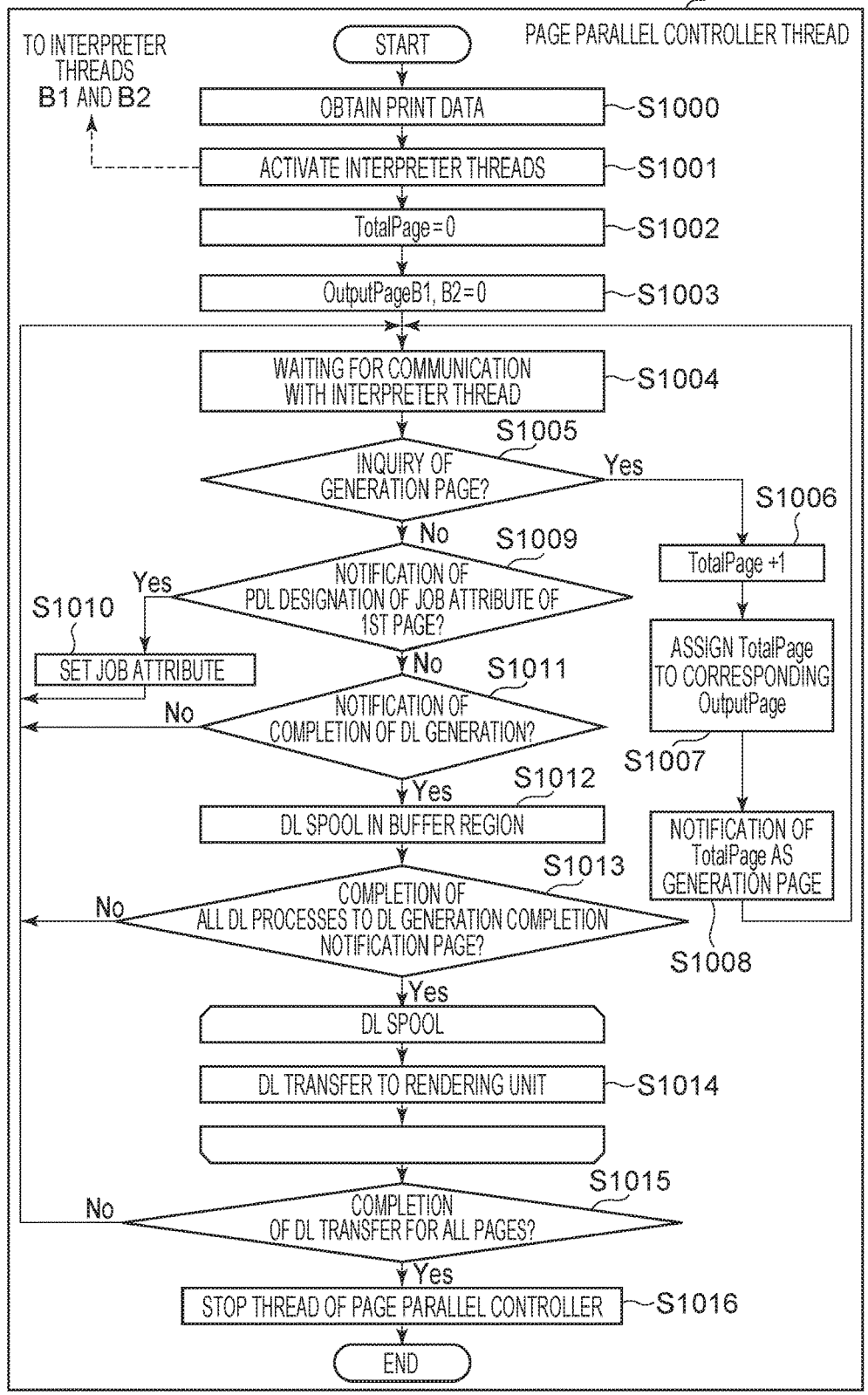
FIG. 8 is a flowchart of a process of a page parallel controller according to the first embodiment.

This process is started when the page parallel controller 200 generates the threads B1 and B2 in step S1001 of FIG. 8 and executions of the interpreters 201 are assigned to the individual threads.

First, in step S1100, each of the interpreters 201 performs a transmission of an inquiry of a page number of a generation page to the page parallel controller 200 which corresponds to the process in step S1004. When the page parallel controller 200 transmits the page number of the generation page, the process proceeds to step S1101.

In step S1101, the interpreter 201 execute language interpretation on print data using the PDL language interpretation unit 202 until PDL designation of a print attribute, a page break command, or an End of File (EOF) of the print data is detected. A result of the interpretation (interpreted data) is stored in the interpreter 201 for DL generation.

In step S1102, the interpreter 201 determines whether the EOF of the print data has been detected as a result of the language interpretation. When the determination is negative, the process proceeds to step S1103, and otherwise, the process is terminated.

In step S1103, the interpreter 201 determines the PDL designation of a print attribute detected as a result of the language interpretation corresponds to a page attribute or a job attribute. When the PDL designation corresponds to a job attribute, the process proceeds to step S1104. When the PDL designation corresponds to a page attribute, the interpreter 201 performs a print setting based on the PDL designation of a page attribute and the process proceeds to step S1106. Specifically, unlike a case of the PDL designation of a job attribute described below, the PDL designation of a page attribute is interpreted, irrespective of a page number, by the interpreter 201 so that a specific process using the setting may be performed on a page of interest.

In step S1104, the interpreter 201 determines whether the page currently processed is a "page which is subjected to the page rendering process for the first time" for the interpreter 201. When the determination is affirmative, the process proceeds to step S1105, and otherwise, the process proceeds to step S1106. In step S1105, the interpreter 201 notifies the page parallel controller 200 of the detected PDL designation of a job attribute. In this way, each of the interpreters 201 notifies the page parallel controller 200 of the PDL designation of a job attribute included in the "page which is subjected to the page rendering process for the first time" for the interpreter 201 in the processing flow in step S1104 and step S1105. Therefore, the PDL designation of a job attribute included in a page other than the first page of the print data may be transmitted. However, since the determination as to whether the transmitted PDL designation of a job attribute is to be enabled or disabled is made by the page parallel controller 200 in step S1009 and step S1010 of FIG. 8, the PDL designation of a job attribute included in the pages other than the first page is not enabled.

In step S1106, the interpreter 201 determines whether the page break command of the generation page has been detected as a result of the language interpretation. Examples of the page break command include PS operators of "showpage", "erasepage", and "copypage". When the page break command is detected, the language interpretation process for one logical page is completed. However, pages before the generation page are subjected to the page skip process, and therefore, when the page break command is detected in a page before the generation page, the process returns to step S1101. On the other hand, in a case whether the page break command is detected in the generation page, the interpreter 201 proceeds to step S1107.

In step S1107, the interpreter 201 causes the DL generation unit 203 to generate a DL of the generation page using the interpreted data stored in step S1101.

In step S1108, the interpreter 201 transmits a notification indicating completion of the DL generation performed on the generation page to step S1004 of the page parallel controller 200.

By the process described above, the interpreter 201 performs the parallel DL generation control in the threads B1 and B2.

As described above, in the image forming apparatus including the central processing unit 101 employing the multi-core CPU, the page parallel controller 200 stores the page counter values which manage page numbers assigned to the individual threads. It is determined whether the PDL designation of job attributes transmitted from the interpreters 201 assigned to the individual threads is enabled or disabled with reference to the page counter values. The page parallel controller enables only the PDL designation of a job attribute supplied from a thread to which the page counter value of 1 is assigned. Accordingly, inconvenience of a notification of the PDL designation of a job attribute caused by the parallel process in a unit of page may be prevented.

Second Embodiment

In the first embodiment, the page parallel controller 200 have the page counter values (OutputPage) which store page numbers of generation pages notified to the individual threads. The page parallel controller 200 switches enabling and disabling of the PDL designation of a job attribute notified from the interpreters 201 in accordance with the values. In a second embodiment, interpreters 201 manage page numbers of generation pages notified from the page parallel controller 200 in accordance with page counter values (TargetPage described below). Then each of the interpreters 201 determines whether the PDL designation of a job attribute is to be notified to the page parallel controller 200 using the value.

Page Parallel Process

Figure 10:
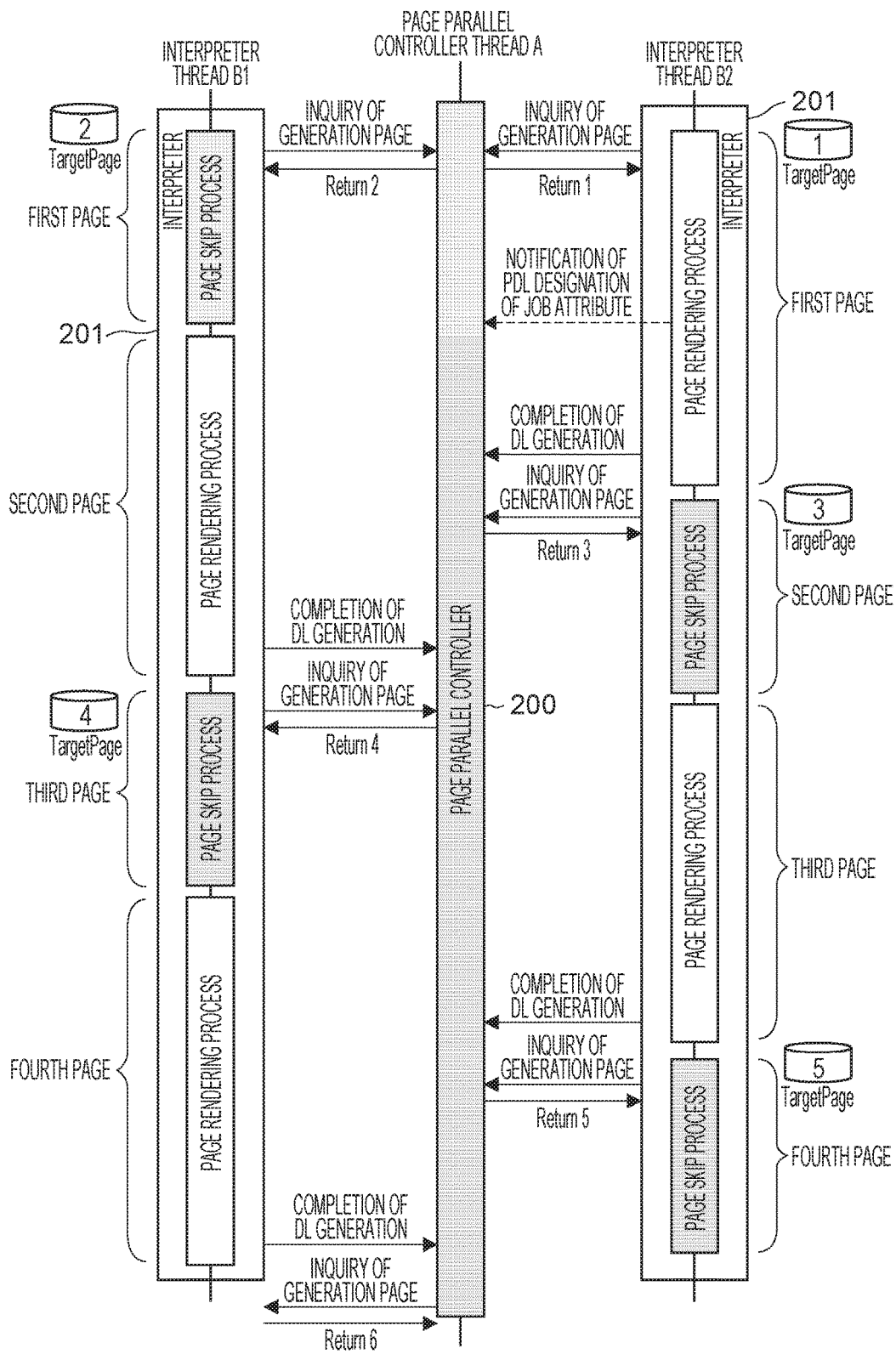
FIG. 10 is a diagram illustrating a sequence of page parallel control according to a second embodiment.

FIG. 10 is a diagram illustrating a sequence of a page parallel process in multithread according to the second embodiment. In the second embodiment, the interpreters 201 have the page counter values (TargetPage) described above for individual threads. As with the example of FIG. 7, a page parallel controller 200 notifies a thread B1 of one of the interpreters 201 of a second page and a thread B2 of the other of the interpreters 201 of a first page as generation pages. The threads B1 and B2 of the individual interpreters 201 store page numbers 2 and 1 of the notified generation pages, respectively, in the page counter values (TargetPage) of the interpreters 201.

In each of the threads B1 and B2, when a page rendering process on the generation page is terminated, a notification indicating completion of DL generation is transmitted to the page parallel controller 200, and thereafter, an inquiry of a page number of a next generation page is transmitted. Each of the interpreters 201 updates the page counter value (TargetPage) of the thread using the page number transmitted as responses to the inquiry.

The page number 1 is transmitted to the thread B2, and it is assumed that PDL designation of a job attribute is detected in the page rendering process performed on the first page. In this case, it is determined whether the PDL designation detected by language interruption on the first page is to be notified to the page parallel controller 200 using a page number of the current generation page with reference to the page counter value (TargetPage). When the page counter value is 1, the detected PDL designation is notified to the page parallel controller 200, and otherwise, the detected PDL designation is not notified. In the example of FIG. 10, "1" is stored in the page counter value of the thread B2 at this timing, and therefore, the detected PDL designation is transmitted to the page parallel controller 200.

On the other hand, in the thread B1, the page number 2 is notified as the generation page, and therefore, the page rendering process is performed on the second page after a page skip process is performed on the first page. It is assumed that the PDL designation of a job attribute is detected in the page rendering process performed on the second page in the thread B1. In this case, "2" is stored in the page counter value of the thread B1, and therefore, the detected PDL designation is not transmitted to the page parallel controller 200.

In this way, each of the interpreters 201 determines whether the PDL designation of a job attribute detected in the corresponding thread is to be notified with reference to the page counter value held by itself. By this, the print attribute of the PDL designation is appropriately controlled.

Control Flow of Page Parallel Controller

Next, page control in the page parallel process performed by the page parallel controller 200 according to the second embodiment will be described with reference to FIG. 11. The processing flow is substantially the same as that of the first embodiment. However, unlike the first embodiment, the page parallel controller 200 does not hold an internal page counter value OutputPage for page control. Furthermore, in a case where a notification of the PDL designation of a job attribute is supplied from the interpreter 201, the PDL designation is set as a print attribute of a job attribute irrespective of a page number. This is because the interpreter 201 determines whether the PDL designation of a job attribute is valid and does not transmit invalid PDL designation of a job attribute, and therefore, the page parallel controller 200 is not required to take the page number into consideration. Hereinafter, a large number of steps in FIG. 11 are the same as those in the processing flow of the page parallel controller 200 of the first embodiment illustrated in FIG. 8, and therefore, a processing flow of FIG. 11 will be described with reference to the processing flow of FIG. 8 where appropriate.

Figure 11:
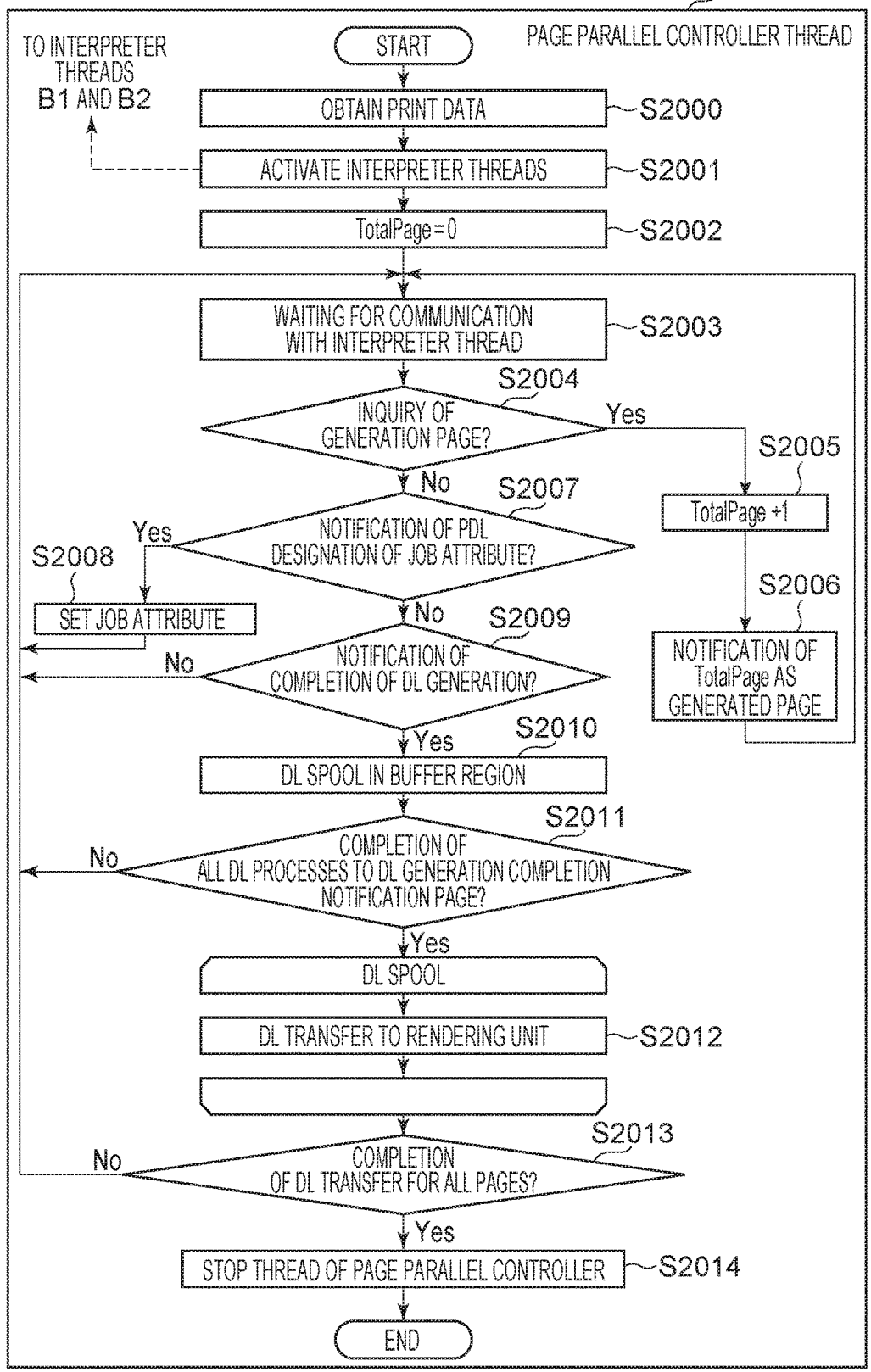
FIG. 11 is a flowchart of a process of a page parallel controller according to the second embodiment.

This process of the processing flow of FIG. 11 is started when print data is received by an NIC 104 and a central processing unit 101 executes a program stored in an auxiliary storage device 103 so as to generate an execution thread A of the page parallel controller 200. The print data received by the NIC 104 is stored in the auxiliary storage device 103.

A process from step S2000 to step S2002 and a process from step S2003 to step S2005 are the same as the process from step S1000 to step S1002 and the process from step S1004 to step S1006 of FIG. 8, respectively.

In step S2007, the page parallel controller 200 determines whether a communication received from the interpreter 201 in step S2003 is a notification indicating PDL designation of a job attribute. When the determination is affirmative, the process proceeds to step S2008, and otherwise, the process proceeds to step S2009.

A process from step S2008 to step S2014 is the same as the process from step S1010 to step S1016 of FIG. 8.

By the process described above, the page parallel controller 200 performs the page control of the page parallel process according to the second embodiment.

Flow of Parallel DL Generation Control of Interpreters

Figure 12:
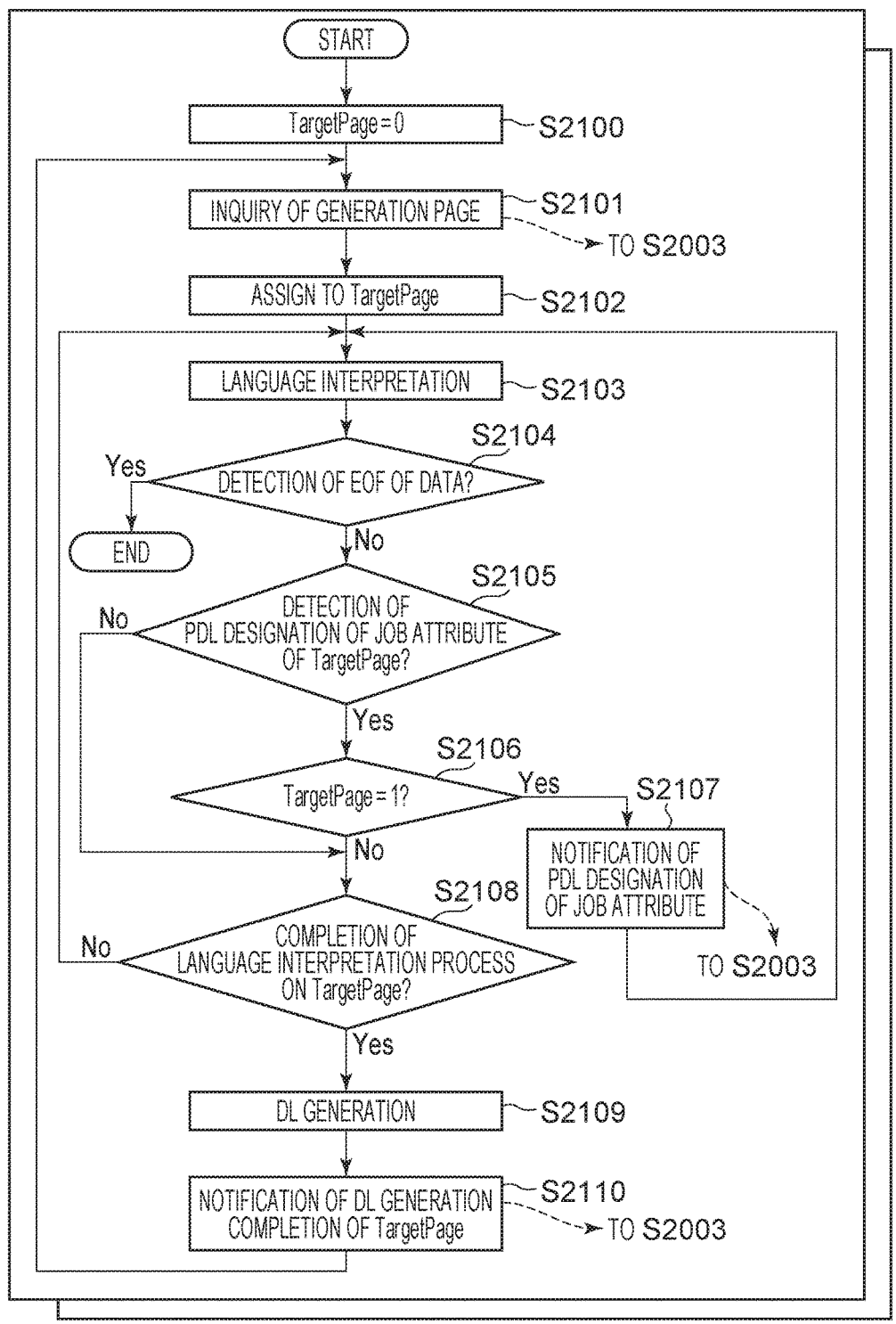
FIG. 12 is a flowchart of processes performed by a PDL language interpretation unit and a DL generation unit according to the second embodiment.

Next, a flow of parallel DL generation control in the threads B1 and B2 of the interpreters 201 will be described with reference to a flowchart of FIG. 12 according to the second embodiment. In the second embodiment, the interpreters 201 have counter values TargetPage as internal page counters. The page counter values TargetPage indicate page numbers of current generation pages. When receiving a page number of a generation page from the page parallel controller 200, each of the interpreters 201 stores the value in the counter value TargetPage and starts a process. Only when PDL designation of a job attribute is detected in a language interpretation process performed on a page corresponding to the counter value TargetPage of 1, a notification is transmitted to the page parallel controller 200. Also in a description of FIG. 12, a number of steps in FIG. 12 are the same as those in the flow of the parallel DL generation control performed by the interpreter 201 of FIG. 9, and therefore, only different steps are described. In step S2001 of FIG. 11, when the page parallel controller 200 generates the threads B1 and B2 of the interpreters 201, this process is started.

In step S2100, the interpreter 201 sets 0 to the internal page counter value TargetPage as an initial process.

In step S2102, the interpreter 201 stores a page number of a generation page notified from the page parallel controller 200 in step S2101 in the internal page counter value TargetPage.

Figure 9:
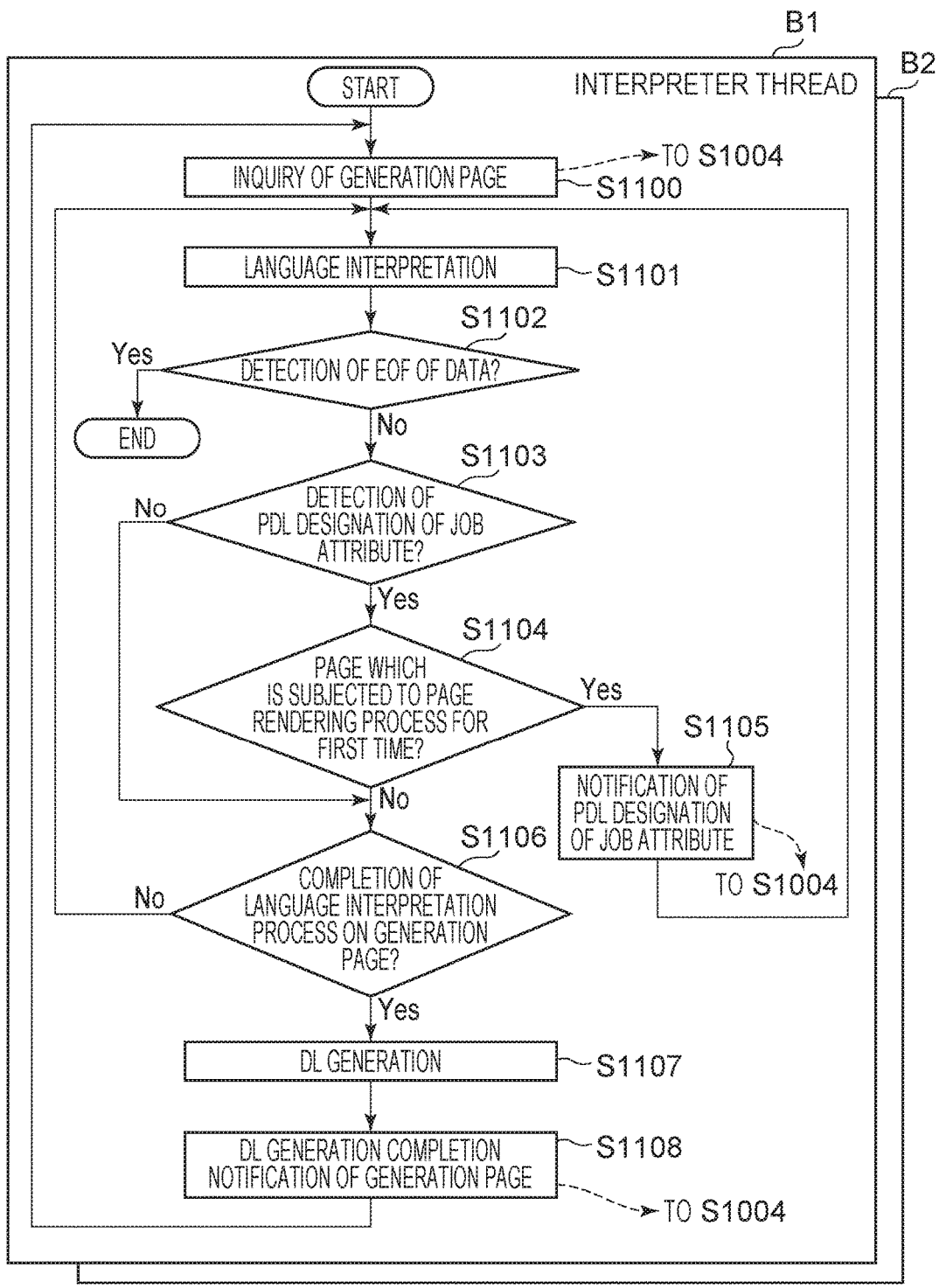
FIG. 9 is a flowchart of processes performed by a PDL language interpretation unit and a DL generation unit according to the first embodiment.

A process from step S2103 to step S2104 is the same as the process from step S1101 to step S1102 of FIG. 9.

In step S2105, the interpreter 201 determines whether PDL designation of a job attribute included in a page indicated by the counter value TargetPage has been detected. When the PDL designation of a job attribute included in the page indicated by the counter value TargetPage is detected, the process proceeds to step S2106, and otherwise, the process proceeds to step S2108.

In step S2106, the interpreter 201 determines whether the value stored in the counter value TargetPage is 1. Specifically, the interpreter 201 determines whether the detected PDL designation is included in a first page of print data. When the determination is affirmative, the process proceeds to step S2107, and otherwise, the process proceeds to step S2108.

A process in step S2107 is the same as the process in step S1105 of FIG. 9.

In step S2108, the interpreter 201 determines whether a language interpretation process performed on the page indicated by the counter value TargetPage is completed. When the determination is affirmative, the process proceeds to step S2109, and otherwise, the process returns to step S2103 and the process from step S2103 onwards is performed again.

A process in step S2109 is the same as the process in step S1107 of FIG. 9.

In step S2110, the interpreter 201 transmits a notification indicating that the DL generation performed on the page indicated by the counter value TargetPage is completed to the process in step S2003 performed by the page parallel controller 200.

By the process described above, the interpreter 201 performs the parallel DL generation control on the threads B1 and B2.

As described above, in the image forming apparatus including the central processing unit 101 employing the multi-core system according to this embodiment, the interpreters 201 manage the page numbers of the current generation pages by the page counter values. By controlling the notification indicating the PDL designation transmitted to the page parallel controller 200, inconvenience of the notification indicating the PDL designation of a job attribute which may occur due to the parallel process in a unit of page may be prevented.

Third Embodiment

PDL designation includes a PDL command (an invalid page command) for clearing rendering content described in a page and disabling output (print) of the page. A page which is not subjected to output (print) in accordance with such a command is referred to as an "invalid page". On the other hand, a page which is to be output (printed) other than the invalid page is referred to as a "valid page". In this embodiment, in a case where a first page is an invalid page, a print setting by PDL designation of a job attribute described in a next valid page is enabled. Specifically, in this embodiment, only PDL designation of a job attribute included in a first valid page included in PDL data is disabled. Note that, in the first and second embodiments, a case where a first page is an invalid page is not taken into consideration, and therefore, only PDL designation of a job attribute included in the first page is simply enabled. However, it is important that a printing apparatus determines whether PDL designation of a job attribute is included in a first valid page (that is, a first page of invalid pages) included in PDL page. Only when the PDL designation of a job attribute is included in the first valid page, the printing apparatus enables a setting by the PDL designation according to a main theme of this specification.

Such a command is also referred to as an "invalid page operator". Taking PostScript as an example, an "erasepage" operator and a "NumCopies" operator to which 0 is assigned are examples of the invalid page operator. In a case where such PDL designation which disables page description is included, the PDL designation of a job attribute is to be used taking an invalid-page number into consideration. In a third embodiment, even in a case of such peculiar print data, PDL designation of a job attribute is appropriately processed.

A PS command having a value of the NumCopies operator of 0 in the PDL designation indicating an invalid page may be described in any portion of a page. On the other hand, the "erasepage" operator is described in a last portion of a page break as a page break command ("showpage", "copypage", and "erasepage" in PostScript). Therefore, in a case where PDL designation of a job attribute is detected before the invalid page is detected, a determination as to whether a page is an invalid page may be performed only after a break command is detected at the end of the page. Therefore, the interpreter 201 of this embodiment does not immediately notify the page parallel controller 200 of a detection of the PDL designation of a job attribute, but temporarily stores the detected PDL designation of a job attribute so as to determine whether the page is an invalid page when a page break command is detected. Then the interpreter 201 determines whether a notification indicating a result of the determination is to be transmitted.

Specifically, based on the configuration of the second embodiment, a page counter value (NonPage) for managing the number of accumulated invalid pages is stored in the interpreter 201 in addition to the page counter value TargetPage. When the interpreter 201 detects PDL designation of a job attribute during a language interpretation process on a page corresponding to the value TargetPage, the PDL designation is temporarily stored. Furthermore, in a case where a PDL command indicating an invalid page is detected, the page counter value NonPage is incremented. When the language interpretation process on the page corresponding to the page count value TargetPage is all terminated, a difference between the values TargetPage and NonPage is obtained, and when a value of the difference is 1, the PDL designation of the job attribute is notified to the page parallel controller 200.

A processing flow of the page parallel controller 200 is the same as that of the second embodiment illustrated in FIG. 11, and therefore, a description of the processing flow is omitted.

Page Parallel Process

Figure 13:
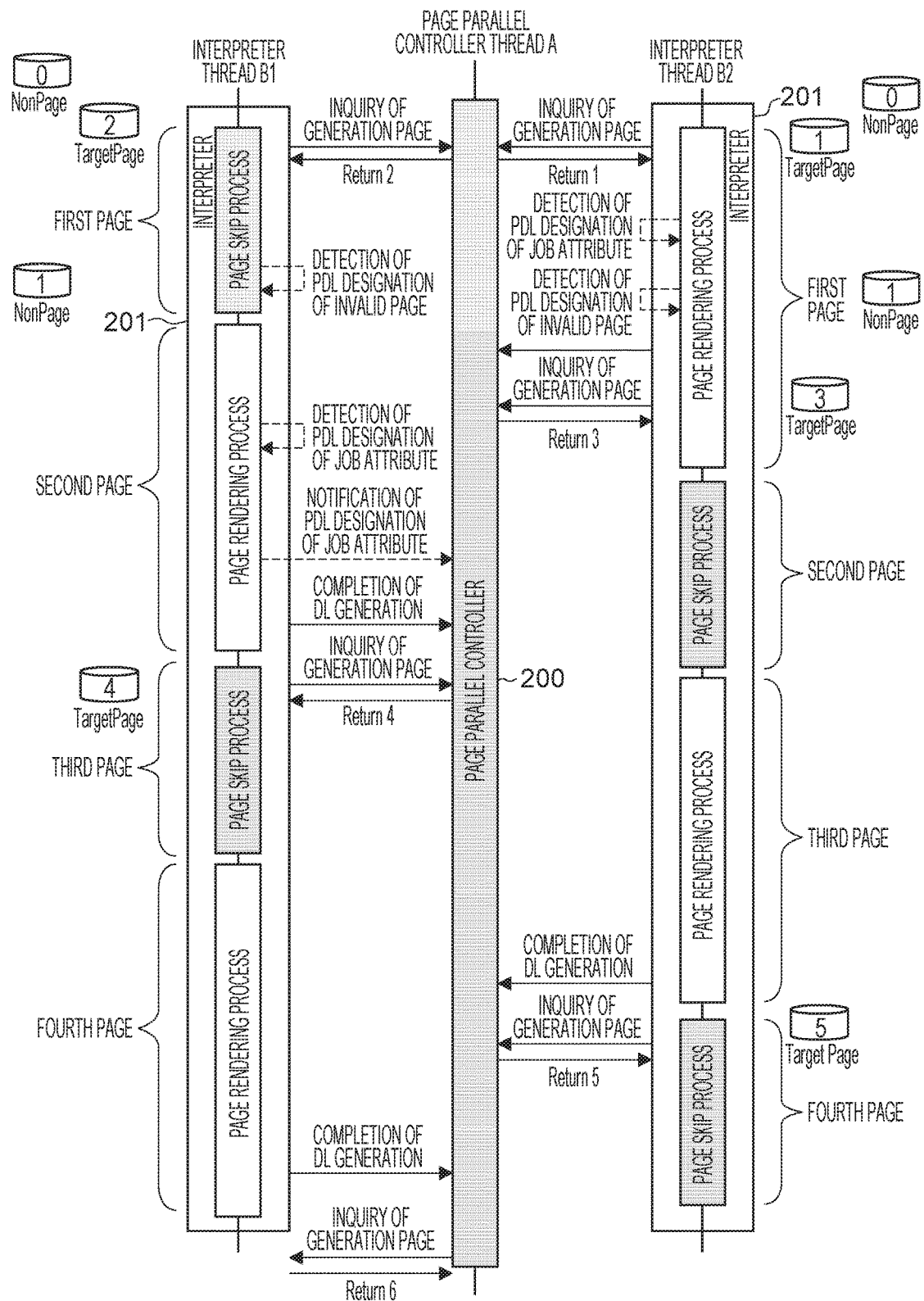
FIG. 13 is a diagram illustrating a sequence of page parallel control according to a third embodiment.

FIG. 13 is a diagram illustrating a sequence of page parallel control in multithread according to the third embodiment. In the third embodiment, in addition to the page counter values (TargetPage) for managing and controlling page numbers of current generation pages, the interpreters 201 hold page counter values (NonPage) for managing invalid pages for individual threads. As with the cases of FIGS. 7 and 10, the page parallel controller 200 notifies the threads B1 and B2 of the interpreters 201 of a second page and a first page as generation pages, respectively. The threads B1 and B2 store "2" and "1" in the page counter values TargetPage, respectively. In each of the threads, when the page rendering process on a specified page is terminated, completion of DL generation is transmitted to the page parallel controller 200, and thereafter, an inquiry of a page number of a next generation page is transmitted. The interpreters 201 store specified page numbers in the page counter values of the threads B1 and B2.

The page number 1 is assigned to the thread B2, and PDL designation of a job attribute is detected in a page rendering process performed on the first page. The thread B2 stores the detected PDL designation in a temporary storage region. Furthermore, when a command indicating an invalid page is detected, the thread B2 increments the counter value NonPage. When detecting a page break command of the counter value TargetPage, the thread B2 calculates a difference between the counter values TargetPage and NonPage and determines whether the stored PDL designation is to be transmitted to the page parallel controller 200 in accordance with a value of the calculated difference. When the difference value is "1", the thread B2 transmits a notification indicating the stored PDL designation to the page parallel controller 200, and otherwise, the thread B2 does not transmit the notification. In the example of FIG. 13, when a page break command of the first page is detected, "3" is stored in the page counter value TargetPage in the thread B2 and "1" is stored in the counter value NonPage since one invalid page is detected. A difference between the counter values TargetPage and NonPage is 2 (=TargetPage−NonPage), and therefore, the thread B2 does not notify the page parallel controller 200 of the PDL designation of a job attribute detected in the first page. Specifically, when the command indicating an invalid page is detected, the interpreter 201 does not transmit a notification indicating the command to the page parallel controller 200 even when the command is detected in the first page. As a result, the PDL designation of a job attribute in the page including the command indicating an invalid page is not enabled.

On the other hand, the page number "2" is assigned to the thread B1, and the thread B1 performs language interpretation and detects an invalid page when a page skip process is performed on the first page and stores 1 in the counter value NonPage. Then the thread B1 performs a page rendering process on the second page which is the generation page indicated by the counter value TargetPage. It is assumed that PDL designation of a job attribute is detected in the page rendering process performed on the second page in the thread B1. When the thread B1 detects a page break command in the second page, a difference between the value TargetPage of 2 and the value NonPage of 1 is 1. Therefore, the thread B1 notifies the page parallel controller 200 of PDL designation of a job attribute detected in the second page. Specifically, the interpreter 201 notifies the page parallel controller 200 of the PDL designation of a job attribute included in a page having a youngest page number in pages which do not include the command indicating an invalid page. As a result, the PDL designation of a job attribute included in the page of the youngest page number in the pages which do not include the command indicating an invalid page is enabled.

In this way, even while the parallel process is performed in a unit of page, a determination as to whether a notification indicating the PDL designation of a job attribute detected in each thread has been issued is made in accordance with a difference between the two types of page counter value stored in the interpreter 201. By this, the print attribute of the PDL designation is appropriately controlled.

Flow of Parallel DL Generation Control of Interpreters

Figure 14:
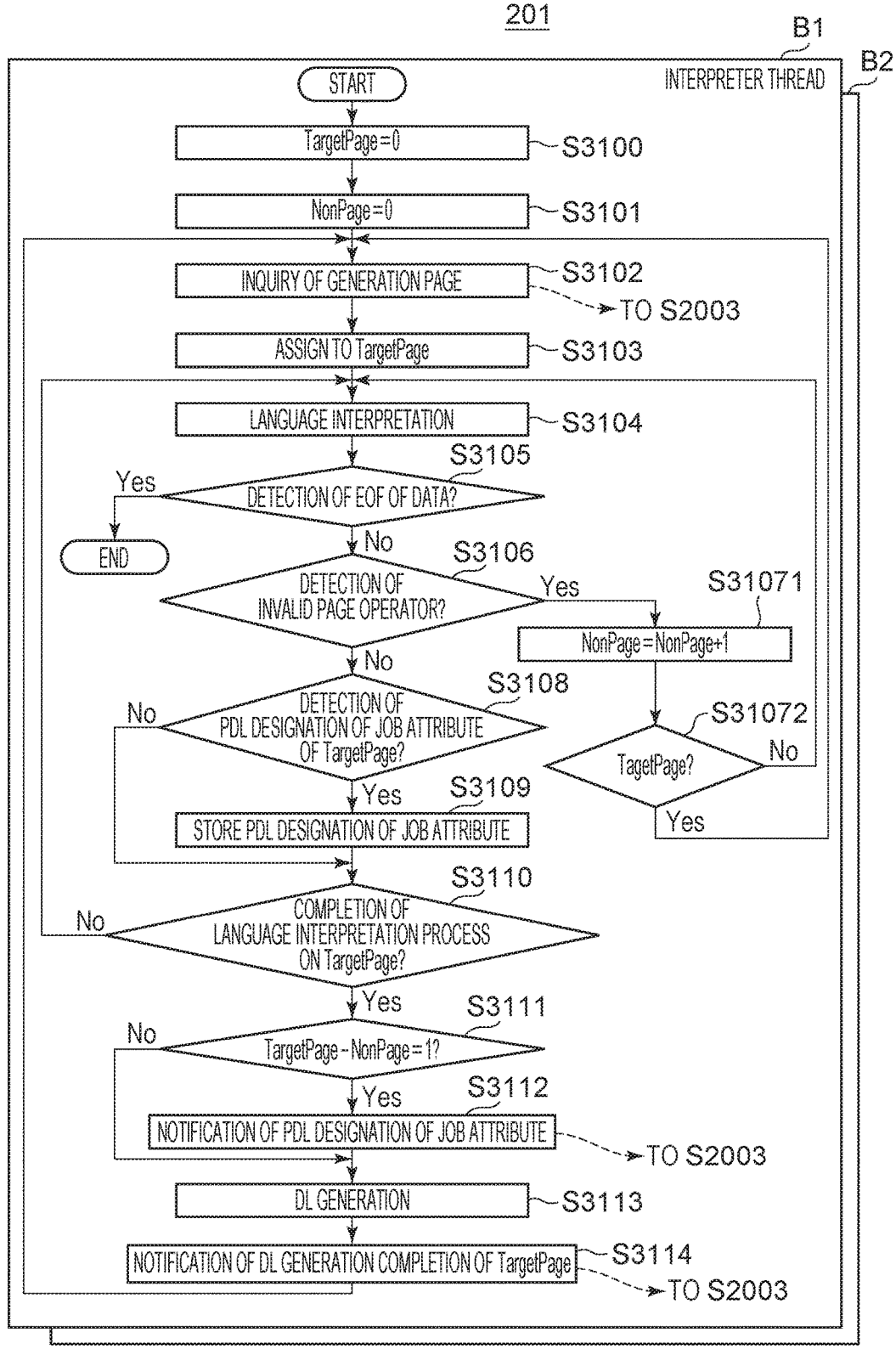
FIG. 14 is a flowchart of processes performed by a PDL language interpretation unit and a DL generation unit according to the third embodiment.

Next, a flow of parallel DL generation control in the threads B1 and B2 of the interpreters 201 according to the third embodiment will be described with reference to a flowchart of FIG. 14. In the third embodiment, the interpreters 201 have counter values TargetPage and NonPage as internal page counters. The counter values TargetPage indicate page numbers of current generation pages. The counter values NonPage indicate the number of pages in which PDL designation (an invalid page operator) representing an invalid page is detected. When receiving a page number of a generation page from the page parallel controller 200, each of the interpreters 201 stores the value in the counter value TargetPage and starts a process. When at least one invalid page is detected in one page, the count value NonPage is incremented by one. When PDL designation of a job attribute is detected, content of the PDL designation is temporarily stored. When a page break command is detected, that is, when a language interpretation process performed on a page corresponding to the value TargetPage is completed, a difference between the values TargetPage and NonPage is calculated. Only when a value of the difference is 1, the PDL designation of a job attribute is transmitted to the page parallel controller 200. In the description performed with reference to FIG. 14, a number of steps are the same as those in the flow of the parallel DL generation control performed by the interpreter 201 illustrated in FIGS. 9 and 12, and therefore, the descriptions in FIGS. 9 and 12 are referred to where appropriate. Note that the processing flow of the page parallel controller 200 is the same as the processing flow in FIG. 11 according to the second embodiment.

A process in step S3100 is the same as the process in step S2100 of FIG. 12.

In step S3101, the interpreter 201 sets 0 to the internal page counter value NonPage as an initial process. The setting to 0 of the value NonPage is the same as a setting of a first page as a page of PDL designation of a job attribute to be notified to the page parallel controller 200 performed in step S3112 described below. Specifically, the interpreter 201 has a function of setting a first page as a specific page to transmit a notification indicating the PDL designation of a job attribute.

A process from step S3102 to step S3105 is the same as the process from step S2101 to step S2104 of FIG. 11.

In step S3106, the interpreter 201 determines whether an invalid page operator has been detected by language interpretation. When the determination is affirmative, the process proceeds to step S31071, and otherwise, the process proceeds to step S3108. Note that if an invalid page operator has been detected and a process in step S31071 has been performed in a current page which has been subjected to the language interpretation process, the interpreter 201 proceeds to step S3108.

In step S31071, the interpreter 201 increments the value NonPage of itself by 1. The increment by 1 of the value NonPage is the same as a setting of a next page as a page of PDL designation of a job attribute to be notified to the page parallel controller 200 performed in step S3112 described below. Specifically, the interpreter 201 has a function of setting a first valid page as a specific page to transmit a notification indicating the PDL designation of a job attribute.

In step S31072, the interpreter 201 determines whether a current page which is being subjected to the language interpretation process is a page indicated by the value TargetPage. When the determination is affirmative, the process proceeds to step S3102 where the interpreter 201 transmits an inquiry of a generation page to the page parallel controller 200. When this inquiry is performed, the page parallel controller 200 notifies the interpreter 201 of a new page number of the generation page in response to the inquiry. Consequently, the interpreter 201 does not perform the page rendering process on pages including the invalid page operator. On the other hand, when the determination is negative in step S31072, the process proceeds to step S3104 where the language interpretation process is continuously performed without updating the value TargetPage. Consequently, even if the invalid page operator is included in a page before the generation page notified by the page parallel controller 200, the interpreter 201 may appropriately perform the page rendering process on the notified generation page.

A process in step S3108 is the same as the process in step S2105 of FIG. 12.

In step S3109, the interpreter 201 temporarily stores the detected PDL designation of a job attribute.

A process in step S3110 is the same as the process in step S2108 of FIG. 12.

In step S3111, the interpreter 201 determines whether a difference between the value TargetPage of itself and the value NonPage of itself is 1. When the determination is affirmative, the process proceeds to step S3112, and otherwise, the process proceeds to step S3113. Specifically, the interpreter 201 determines whether a page corresponding to a page number indicated by the value TargetPage is a first page (a beginning page) except for invalid pages. In other words, a determination as to whether pages before the page having the page number indicated by the value TargetPage are all invalid pages is made in step S3111.

In step S3112, the interpreter 201 notifies the page parallel controller 200 of the PDL designation of a job attribute stored in step S3109.

A process from step S3113 to step S3114 is the same as the process from step S2109 to step S2110 of FIG. 12.

By the process described above, the interpreters 201 perform the parallel DL generation control in the threads B1 and B2.

As described above, in the image forming apparatus including the central processing unit 101 employing the multi-core system according to this embodiment, the interpreters 201 manage the page numbers of the current generation pages by the page counter values. In addition, the image forming apparatus holds counter values which count the numbers of times PDL designation indicating an invalid page is detected. By controlling the notification indicating PDL designation transmitted to the page parallel controller 200, inconvenience of the notification indicating PDL designation of a job attribute which may occur due to the parallel process in a unit of page may be prevented using a difference between the two counter values.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-029523 filed Feb. 19, 2016, which is hereby incorporated by reference herein in its entirety.

What is claimed is:

1. A printing apparatus that performs image forming processing based on print data by using a plurality of interpreters for parallel execution of interpretation processing of commands in the print data, comprising:
   at least one controller having a processor that executes programs stored in a memory or having a circuitry having functions implemented therein, the at least one controller configured to function as:
   the plurality of interpreters configured to interpret the commands in the print data of at least a first page of a specific page number and a second page of a page number different from the specific page number; and
   a determination unit configured to determine, among a plurality of pages of the print data, at least one page in which commands are to be interpreted by one of the plurality of interpreters and at least one different page in which commands are to be interpreted by another of the plurality of interpreters;
   wherein the controller applies a result of an interpretation of a command of a specific type in the first page of the specific page number to all pages of the plurality of pages, and does not apply a command of the specific type in the second page to any of the all pages, and
   wherein the specific type is a type of a setting, which is applied to all pages of the print data.

2. The printing apparatus according to claim 1, wherein the controller applies a command which is not a command of the specific type in the second page to the second page only.

3. The printing apparatus according to claim 1, wherein the specific page number is one.

4. The printing apparatus according to claim 1, the controller further configured to function as:
   a rendering unit configured to render a page for which intermediate data is generated based on interpretation results by the plurality of interpreters; and
   a printing unit configured to cause a print device to print a page rendered by the rendering unit.

5. The printing apparatus according to claim 1, wherein a command of the specific type is a command for a regarding image sharpness.

6. The image processing apparatus according to claim 1, wherein the print data is PDL data in PostScript format.

7. The printing apparatus according to claim 1, wherein the finishing setting command is a command for a staple binding process.

8. A control method for controlling a printing apparatus that performs image forming processing based on print data by using a plurality of interpreters for parallel execution of interpretation processing of commands in the print data, comprising:
   interpreting the commands in the print data of at least a first page of a specific page number and a second page of a page number different from the specific page number; and
   determining, among a plurality of pages of the print data at least one page in which commands are to be interpreted by one of the plurality of interpreters and at least one different page in which commands are to be interpreted by another of the plurality of interpreters;
   wherein a result of an interpretation of a command of a specific type in the first page of the specific page number is applied to all pages of the plurality of pages, and a command of the specific type in the second page is not applied to any of the all pages,
   wherein the specific type is a type of a setting, which is applied to all pages of the print data.

9. The control method according to claim 8, further comprising:
   applying a command which is not a command of the specific type in the second page to the second page only.

10. The control method according to claim 8, wherein the specific page number is one.

11. The control method according to claim 8, further comppprising:
    rendering a page for which intermediate data is generated based on interpretation results by the plurality of interpreters; and
    printing a page rendered by rendering.

12. The control method according to claim 8, wherein a command of the specific type is a command for a regarding image sharpness.

13. The control method apparatus according to claim 8, wherein the print data is PDL data in PostScript format.

14. The control method according to claim 8, wherein the finishing setting command is a command for a staple binding process.

* * * * *